United States Patent [19]

Eisenbarth et al.

[11] Patent Number: 4,975,506
[45] Date of Patent: Dec. 4, 1990

[54] BISMALEIMIDE RESIN FROM BIS(MALEIMIDO PHENOXY)BENZENE

[75] Inventors: Philipp Eisenbarth, Bad Durkheim; Lothar Franz, Ludwigshafen, both of Fed. Rep. of Germany

[73] Assignee: BASF Aktiengesellschaft, Ludwigshafen, Fed. Rep. of Germany

[21] Appl. No.: 219,640

[22] Filed: Jul. 18, 1988

[30] Foreign Application Priority Data

Jul. 21, 1987 [DE] Fed. Rep. of Germany ....... 3724055

[51] Int. Cl.$^5$ .................. C08F 22/40; C08G 73/10
[52] U.S. Cl. .................... 526/262; 526/313; 528/170; 528/322
[58] Field of Search ............ 526/262, 313; 528/322, 528/170

[56] References Cited

U.S. PATENT DOCUMENTS

| 4,435,560 | 3/1984 | Takahashi et al. | 526/262 |
| 4,743,647 | 5/1988 | Domeier | 526/262 |
| 4,831,102 | 5/1989 | Yamaya et al. | 528/322 |

FOREIGN PATENT DOCUMENTS 3142010 6/1988 Japan .................. 526/262

Primary Examiner—Harold D. Anderson
Attorney, Agent, or Firm—William G. Conger

[57] ABSTRACT

Bismaleimide resins contain a bismaleimide of the formula

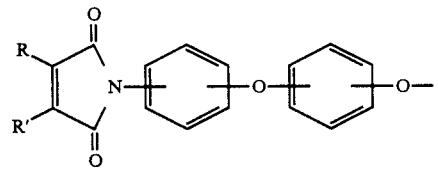

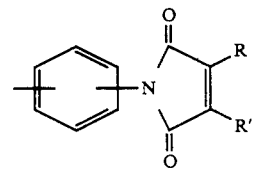

where R and R' are each hydrogen, methyl or phenyl.

2 Claims, No Drawings

BISMALEIMIDE RESIN FROM BIS(MALEIMIDO PHENOXY)BENZENE

The present invention relates to heat-curable molding materials based on bismaleimide resins.

Aromatic bismaleimide monomers which are used for the preparation of bismaleimide resins, for example according to DE-A No. 1 770 867, DE-A No. 2 459 925 or U.S. Pat. No. 4,100,140, are relatively short-chain compounds containing one or two phenylene rings, for example 4,4'-bismaleimidodiphenylmethane, 4,4'-bismaleimidodiphenyl ether or 2,4-bismaleimidotoluene. The materials prepared therefrom have very good mechanical properties above 200° C. but, because of the high crosslinking density, are brittle and absorb a relatively large amount of moisture, which has an adverse effect on their mechanical behavior under hot humid conditions. Because of the high melting points, the poor solubility in low boiling solvents and the tendency to recrystallization, the above-mentioned bismaleimides are relatively difficult to process to semifinished products or prepregs for composite materials.

One method of improving the processibility and solubility is, for example, to use low-melting bismaleimide mixtures obtainable by adding an aliphatic maleimide, although this reduces the heat stability of the polymer.

It is an object of the present invention to provide bismaleimide resins which do not have the stated disadvantages.

We have found that this object is achieved by the novel resins which contain, as the bismaleimide component A, a bismaleimide of the formula I

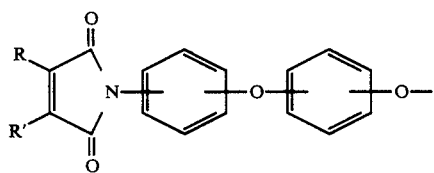

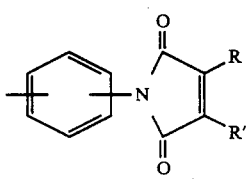

where R and R' are each H, methyl or phenyl.

Bismaleimides of the formula I are, for example, 1,3-bis-(3-maleimidophenoxy)-benzene, 1,4-bis-(3-maleimidophenoxy)-benzene, 1,3-bis-(4-maleimidophenoxy)benzene and 1,4-bis-(4-maleimidophenoxy)-benzene. They can be prepared by known processes, for example according to DE-B No. 20 40 094, by reacting a diamine of the formula II with 2 equivalents of maleic anhydride and then dehydrating the product.

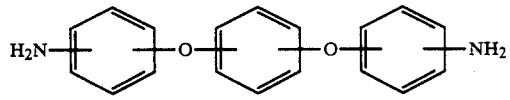

Diamines of the formula II are known. Preferred bismaleimides are 1,3-bis-(3-maleimidophenoxy)-benzene and 1,3-bis-(4-maleimidophenoxy)-benzene.

The novel bismaleimide resins are obtained by reacting a bismaleimide A of the formula I alone or in combination with further bismaleimides, for example 4,4'-bismaleimidodiphenylmethane, 2,4-bismaleimidotoluene, 1,3-bismaleimidobenzene, 3,3'-bismaleimidodiphenyl sulfone, 1,6-bismaleimidohexane, 1,8-bismaleimidooctane or 1,6-bismaleimido-2,2,4-trimethylhexane, with a comonomer B. It is also possible to add tri-, tetra- or polymaleimides and monomaleimides, for example N-phenyl- or N-allylmaleimide. Suitable comonomers B are polyamines, polyphenols, alkenylphenols of -phenol ethers, aminophenols and vinyl and allyl compounds. Polyamines which are suitable comonomers are disclosed in, for example, DE-A No. 1 770 867; 4,4'-diaminodiphenylmethane, 4,4'-diaminodiphenyl sulfone and 3,3'-diaminodiphenyl sulfone are preferred. Examples of suitable polyphenols are bisphenol A, bisphenol F and novolaks; further substances are listed in U.S. Pat. No. 4,100,140. Suitable alkenylphenols or -phenol ethers are described in DE-A No. 2 627 045, o,o-diallylbisphenol A being preferred. Oligomeric aryl ether sulfones or ketones having terminal allyl or propenyl groups, according to EP-A No. 230 741, are likewise suitable. Examples of aminophenols which can be used are m- and p-aminophenol. Examples of vinyl and allyl compounds are styrene, divinylbenzene, diallyl phthalate, acrylates, diallyl benzene, triallyl isocyanurate, triallyl cyanurate and vinylpyrrolidone. The amount of these is from 5 to 100% by weight, based on A.

In a preferred embodiment, the novel resins contain, as a comonomer, a diamine of the formula II which has the same structural unit as the bismaleimides of the formula I. The addition of these reinforces the improvements in properties which are achieved by the use of the bisimides I. The amount of these is from 20 to 80% by weight, based on A. Preferred diamines are 1,3-bis-(3-aminophenoxy)-benzene and 1,3-bis-(4-aminophenoxy)-benzene.

Depending on the intended use, it may be advantageous to add further components to the resins according to the invention. Examples of suitable resins are epoxy resins or cyanate resins, preferably in amounts of from 5 to 40% by weight, based on A.

Other additives are catalysts and inhibitors. Suitable catalysts are tertiary amines, imidazoles, organic acids, tertiary phosphines, peroxides and metal compounds. Examples of inhibitors are hydroquinone, benzoquinone and phenothiazine. The amount of initiators or inhibitors used should be about 0.01–1.5% by weight, based on A.

The novel resins may furthermore contain the additives conventionally used in the technology of curable plastics, such as fillers, plasticizers, pigments, dyes, mold release agents and flame-retardant substances. The fillers used may also be glass fibers, carbon fibers, graphite powder, mica, quartz powder, kaolin or metal powders, which may be present in an amount of up to 80% by weight, based on A+B.

In addition to relatively good solubility, even in low boiling solvents, the novel resins possess substantially lower softening points and viscosities than resins based on the conventionally used 4,4'-bismaleimidodiphenylmethane or those based on 4,4'-bismaleimidodiphenyl ether, which, owing to the higher molecular weight of the bismaleimides I, was not to be expected. In particular, this results in substantially improved processibility, for example in the melt impregnation of reinforcing fibers, since this can be carried out at low temperatures. Furthermore, the prepreg tack desired by many processors of semifinished products in aircraft construction is advantageously affected. Comparative experiments furthermore showed that the novel resins have a substantially smaller tendency to recrystallization. There are also advantages over resins based on diaminodiphenylmethane and diaminodiphenyl ether in the properties of the cured resins. For example, the modulus of elasticity and the impact strength are significantly increased, the effect becoming more pronounced with increasing content of diphenoxybenzene structures in the polymer. Just as surprising as the further increase in the modulus despite a reduced crosslinking density is the considerable reduction of the moisture absorption of the novel resins, although the presence of several ether groups was expected to lead to greater affinity to hydrogen bridge bonds. Since the relative content of aliphatic molecular structures is reduced, the novel resins have excellent heat stability.

The resins according to the invention can be used as impregnating, casting and laminating resins, as molding materials (with or without fillers) or as adhesives.

If they are used for the production of high performance composite materials, impregnation of glass fibers, carbon fibers or aramid fibers with formation of unidirectional prepregs or fabric prepregs can be carried out either from the melt at 50°-150° C. or from solution. Suitable solvents are halohydrocarbons, eg. dichloromethane, ketones, eg. acetone or methyl ethyl ketone, glycol esters, toluene, dimethylformamide, N-methylpyrrolidone and mixtures of several solvents.

For the preparation of the novel bismaleimide resins, the starting materials are mixed using a conventional technique and are heated to 70°-190° C., a prepolymer being formed. Depending on the extent to which the prepolymerization has progressed, a highly viscous melt or a glassy solid is obtained, the solid being milled or dissolved in a solvent, depending on the intended use. The resins may also be prepared in one of the above-mentioned solvents.

The resins according to the invention are cured at about 100°-300° C., under atmospheric or superatmospheric pressure, preferably at 160°-260° C. The length of the curing time is critical with regard to the choice of curing temperature. In many cases, stepwise curing is advantageous, the polymer being crosslinked at a low temperature, initially with shaping. Removal from the mold may then be followed by postcuring at above 200° C., for several hours under certain circumstances to effect complete curing.

The novel resins can be converted into high performance materials, for example insulating materials, structural components, apparatus housings, printed circuit boards and electrical components, which are exposed to high temperatures.

EXAMPLES

Preparation of 1,3-bis-(3-maleimidophenoxy)-benzene

A solution of 584 g of 1,3-bis-(3-aminophenoxy)benzene in 1,000 ml of acetone is added dropwise to a solution of 392 g of maleic anhydride and 11 g of nickel(II) acetate tetrahydrate in 1,000 ml of acetone at 10°-20° C. in the course of 1 hour. Stirring is continued for 2 hours, after which 612.6 g of acetic anhydride and 121.5 g of triethylamine are added. After heating has been carried out for 3 hours at 50° C., the mixture is cooled and 5,000 l of water are added dropwise. The precipitated product is filtered off, washed, and dried at 70° C. under reduced pressure. 747 g (82%) of 1,3-bis-(3-maleimidophenoxy)-benzene are obtained as pale yellow crystals of melting point 138°-140° C.

Preparation of bismaleimide resins 1. 678 g of 1,3-bis-(3-maleimidophenoxy)-benzene and 0.85 g of 2,6-dimethylhydroquinone are melted in a reaction vessel at a bath temperature of 160° C. while stirring. 118.8 g of 4,4'-diaminodiphenylmethane are then added and the liquid resin material is then further processed after 5 minutes as follows:

(a) One part of this resin material is poured onto a metal foil to effect more rapid cooling. The resulting reddish brown resin has a softening point of 46° C. (Kofler bench) and its melt viscosity is 260 mPa.s at 125° C.

(b) The remaining part of the resin material is poured into two metal molds measuring 30×30×0.1 cm and 0.4 cm and cured for 3 hours at 160° C., for 3 hours at 190° C. and for 20 hours at 250° C. The modulus of elasticity according to DIN 53,457 is 4,500 N/mm$^2$ and the impact strength according to DIN 53,445 is 18.5 kJ/ m$^2$. After storage for 14 days in water at 70° C., the water absorption is found to be 2.92%. 2. A resin is prepared as described in Example 1 from 565 g of 1,3-bis-(3-maleimidophenoxy)-benzene and 146 g of 1,3-bis-(3-aminophenoxy)-benzene and is further processed as described there. The softening point of the uncured resin is 40° C. The modulus of elasticity is 4520 N/mm$^2$, the impact strength is 23.1 kJ/m$^2$ and the water absorption is 2.58%. 3. A resin is prepared as described in Example 1 from 716 g of 4,4'-bismaleimidodiphenylmethane and 233.6 g of 1,3-bis-(3-maleimidophenoxy)-benzene and is further processed as described there. The softening point of the resin is 42° C., the modulus of elasticity is 3,990 N/mm$^2$, the impact strength is 11.8 kJ/m$^2$ and the water absorption is 4.72%.

COMPARATIVE EXAMPLES 3a.

A resin is prepared as described in Example 3 from 716 g of 4,4'-bismaleimidodiphenylmethane and 158 g of 4,4'-diaminodiphenylmethane and is further processed as described there. The softening point of the resin is 65° C., the modulus of elasticity is 3,510 N/mm², the impact strength is 11.3 kJ/m² and the water absorption is 5.26%. 3b. A resin is prepared as described in Example 3 from 9.0 g of 4,4'-bismaleimidodiphenyl ether and 1.98 g of 4,4'-diaminodiphenylmethane and is further processed as described in (a). The softening point of the resin is 77° C. and its viscosity at 125° C. is greater than 1,000 mPa.s. 4. A resin is prepared similarly to Example 1, but without an inhibitor, from 35 g of 1,3-bis-(3-maleimidophenoxy)-benzene and 15 g of o,o-diallylbisphenol A. The resin has good tack at room temperature and still shows no signs of recrystallization after 5 days. Its viscosity at 125° C. is less than 50 mPa.s. After curing for 2 hours at 160° C., for 2 hours at 190° C. and for 12 hours at 240° C., the polymer has a water absorption of 3.20% (14 days in water at 70° C.).

COMPARATIVE EXAMPLES 4a.

A resin is prepared according to Example 4 from 35 g of 4,4'-bismaleimidodiphenylmethane and 15 g of o,o-diallylbisphenol A. The tack at room temperature is less than that of Example 4; after 2 days, the bismaleimide used has partially crystallized out. The viscosity of the resin at 125° C. is 80 mPa.s. The water absorption of the cured polymer is 5.0%. 4b. A resin is prepared according to Example 4 from 7 g of 4,4'-bismaleimidodiphenyl ether and 3 g of o,o-diallylbisphenol A. The tack at room temperature is substantially lower than that of Example 4; the bismaleimide used has partially crystallized out after 1 day. The viscosity of the resin at 125° C. is 170 mPa.s. The water absorption of the cured polymer is 5.11%. 5. A resin is prepared similarly to Example 1 from 8.59 g of 1,3-bis-(3-maleimidophenoxy)-benzene and 1.09 g of 3-aminophenol. The softening point of the resin is 52° C. and its viscosity at 125° C. is 140 mPa.s.

COMPARATIVE EXAMPLES 5a.

A resin is prepared similarly to Example 5 from 8.6 g of 4,4'-bismaleimidodiphenylmethane and 1.09 g of 3-aminophenol. The softening point of the resin is 60° C. and its viscosity at 125° C. is 730 mPa.s. 5b. A resin is prepared similarly to Example 5 from 6.76 g of 4,4'-bismaleimidodiphenyl ether and 1.09 g of 3-aminophenol. The softening point of the resin is 101° C. and its viscosity at 125° C. is greater than 1,000 mPa.s. 6. A resin is prepared similarly to Example 4 from 60 g of 1,3-bis-(4-maleimidophenoxy)-benzene and 40 g of o,o-diallylbisphenol A. Its gelling time at 160° C. is 36 minutes.

We claim:
1. A heat curable bismaleimide resin containing
   (A) a bismaleimide and
   (B) 5–100% by weight, based on A, of a comonomer selected from the group consisting of an alkenylphenol, and an alkenylphenol ether, wherein the component A contains not less than 1% by weight of the bismaleimide of the formula I

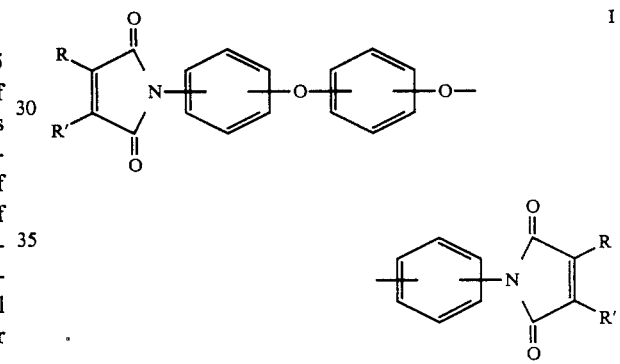

where R and R¹ are each hydrogen, methyl or phenyl.

2. the composition of claim 1 wherein said alkenylphenol is o,o'-diallylbisphenol A.

* * * * *